3,316,244
PROCESS FOR THE PREPARATION OF HEXAHYDRO - 1,3 - DIMETHYL - 4 - PHENYLAZEPINE - 4 - CARBOXYLIC ACID, ETHYL ESTER

Stanley C. Bell and Scott J. Childress, both of Philadelphia, Pa., assignors to American Home Products Corporation, New York, N.Y., a corporation of New York
No Drawing. Filed June 5, 1964, Ser. No. 373,089
2 Claims. (Cl. 260—239)

The present invention relates in general to the preparation of useful analgesic agents commonly referred to as "azacycloheptanes," but which are preferably, under the most preferred rules of nomenclature, termed "azepines." In particular, the invention defines an improved method for a preferential synthesis of the following specific members of such series having the general formula:

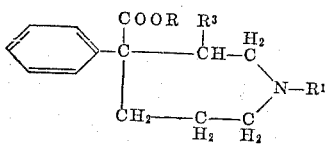

(I)

wherein the radicals represented by the symbols R, $R^1$, and $R^3$ respectively, which are either similar or dissimilar to each other, are lower alkyl groups preferably those having less than 4 carbon atoms. Most preferably, the compound formed is that wherein $R^1$ and $R^3$ represent methyl groups and R represents an ethyl group.

The previous method for preparing the compounds of (I) above is generally outlined in U.S. Patent 2,740,777 of Diamond et al. granted on Apr. 3, 1956. The preparation disclosed therein involves the alkylation of the starting compound 2-aryl-4-dialkylamino butyronitrile. This alkylation is carried out in the presence of a reagent capable of displacing active hydrogen, such as sodium amide, and employing as reaction solvent either a lower alkyl ether or an aromatic hydrocarbon such as benzene. Substantially anhydrous conditions are utilized for the alkylation, and for best results an inert atmosphere is maintained.

Following the alkylation reaction, the product obtained is (a) cyclized to form a cyclic quaternary ammonium compound, (b) partially decomposed (c) hydrolyzed and finally (d) esterified to form the 4-carbalkoxy substituted compound.

The above process of the prior art however, has the inherent limitation for yielding final products which comprise only about 50% of the compound of structure (I) wherein $R^1$ and $R^3$ are lower alkyl, more particularly methyl. The remaining product formed is usually one where the alkylated end product is the methylated 1, 2 analog of structure (I). Specifically in a typical reaction run according to the above synthesis conditions one will obtain approximately 50% of the compound 4-carbethoxy-1,3-dimethyl-4-phenylazacycloheptane and 50% of its isomer 4-carbethoxy-1,2-dimethyl-4-phenylazacycloheptane. This fact becomes quite important from a process standpoint when one considers that the former compound is a highly potent analgesic in the range of morphine with very low or non-existent addicting liability while the latter is a less active analgesic with attendant side effects.

It is an object of the present invention therefore, to disclose for the first time a new and improved method for preparing the hexahydro-1,3-dimethyl-4-phenylazepine-4-carboxylic acid (4-carboxy-1,3-dimethyl-4-phenylazacycloheptane) and its ethyl ester in a preferentially high yield over its isomer, hexahydro-1,2-dimethyl-4-phenylazepine-4-carboxylic acid (4-carboxy-1,2-dimethyl-4-phenylazacycloheptane).

Accordingly, we have now quite unexpectedly found that the yield of the highly potent analgesic agent hexahydro 1,3-dimethyl-4-phenylazepine-4-carboxylic acid ester may be increased from 50 to about 90 percent of the total useful reaction product obtained by use of a new method of alkylating the product intermediate, in its initial stages of formation. In essence, we have quite surprisingly found improvement in the first alkylation step (of a phenylacetonitrile) over that alkylation set forth in the patent noted above. In this first alkylation the reaction is kept under 50° and dimethyl formamide is the critical solvent for the reaction. As a result of this first alkylation, the starting compound (2-aryl-4-dialkylamino butyronitrile) of the patent, is obtained. Replacement of the lower alkyl ether or aromatic hydrocarbon reaction solvent formerly used in the alkylation step of the patent with a new solvent, namely the compound dimethyl formamide, in a preliminary alkylation step will quite unexpectedly cause not only a sharp shift in yield toward the potent isomer, but also increases the overall yield of the synthesis. In an equivalent manner the solvent such as dimethyl acetamide may be employed. In other words, the use of our new and critical reaction conditions effects a useful and unexpected change in both the quantity, and more important, the composition of the reaction products recovered by the process generally described in U.S. Patent No. 2,740,777 of Diamond et al. referred to above.

As a still further aspect to the present invention it should be pointed out that all of the substituted azepines obtained by the present process are asymmetrical in configuration and the product obtained is a racemic mixture of optically active substances. This dl compound upon resolution by treatment of the free base with an optically active organic carboxylic acid will yield a + form of the hexahydro 1,3-dimethyl-4-phenyl-azepine-4-carboxylate; a highly potent analgetic, and − form of the said isomer which is inert in this property. Hence in commercial operation a process having a resolution step appended thereto would be obviously much superior if it had such resolution preceded by a synthesis which gave a 90% rather than a mere 50% yield of a resolution susceptible material. Therefore from the standpoint of plant operating economy as well as over all efficiency of operation the present improved process for synthesis of hexahydro-1,3-dimethyl-4-phenylazepine-4-carboxylic acid ester has valuable advantages over previous methods known and employed to produce this compound in the past.

The particular moiety of the general reaction which comprises the alkylation of an aryl substituted 4-dialkylamino butyronitrile may be represented hence:

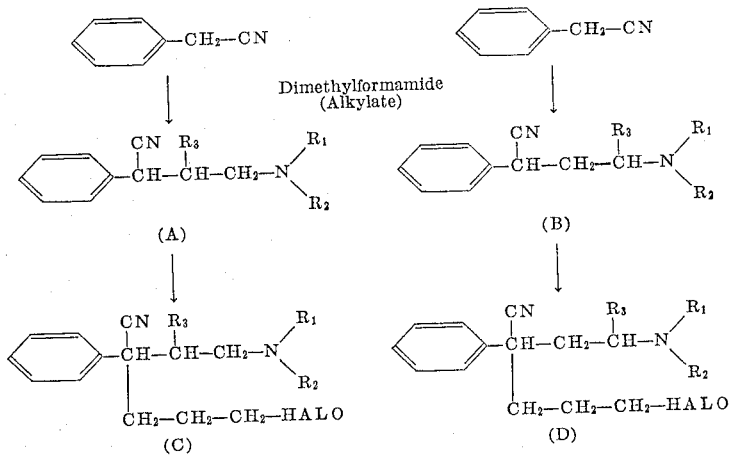

It is at this stage of the reaction that the use of dimethyl formamide (DMF) as the critical reaction solvent, in a first alkylation, causes the promotion of the formation of A in preference to B with the ultimate resultant formation of the active isomer represented by the Formula I above rather than the relatively inactive form (II):

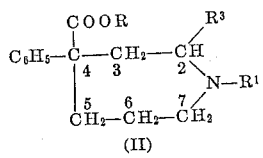

Wherein R, $R^1$, and $R^3$ have the values as stated above. It is of course, understood that the intermediates C and D below would be further cyclyzed, hydrolyzed and esterified in the same manner shown in USP 2,740,777 to obtain the products represented by (I) and (II) herein to wit:

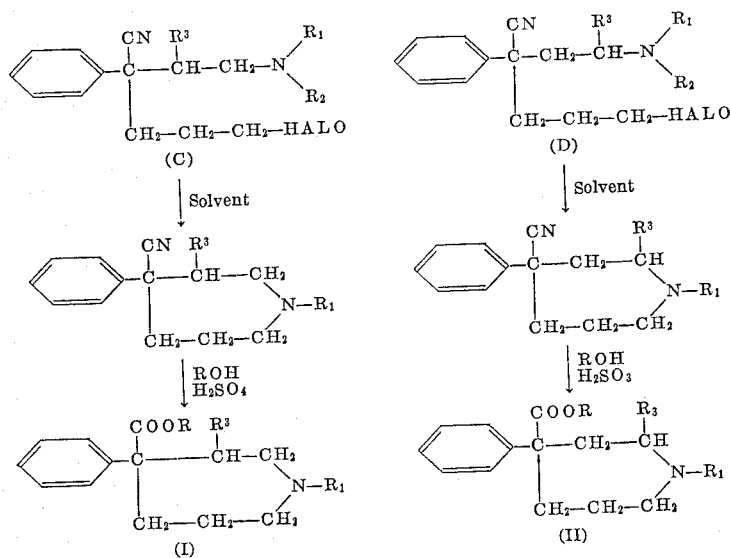

The details of this remaining part of our improved synthesis will however be amply denoted by the following example of the complete process including its improvement. It is understood that the following embodiment is intended only to specifically teach one versed in the art how to operate our improved mode of synthesis and is not intended to limit the inventive concept illustrated thereby in any manner. For a limiting legal definition of the proper legal scope of our invention attention must be directed to the several appended claims.

*Example 1*

A. Phenylacetonitrile (600 g.) was dissolved in 2 l. of dimethylformamide; to this solution at room temperature was added in portions during 2 hours 240 g. of 55% NaH-oil dispersion. The temperature was kept below 50°; a nitrogen atmosphere was maintained, and the mixture was stirred for 2 additional hours. This was labelled solution A.

A fresh solution of 1-dimethylamino-2-chloropropane was prepared from a filtered solution of 900 g. of the hydrochloride in 1 l. of water by adding 520 ml. of 10 N sodium hydroxide and extracting the oil into 1.5 l. of toluene which was thereupon dried with sodium sulfate. (Solution B.)

The toluene solution B was filtered from drying agent and trickled into the above solution A at a temperature of 10–20° during 1 hour. The mixture was stirred during addition and for a further 2 hours.

Water (100 ml.) was cautiously added. This was followed by about 8 l. of water and 1.5 l. of toluene. This mixture was shaken and the water layer was discarded. The toluene layer was washed with an equal volume of water and then extracted with 1 l. of 6 N HCl with cooling. The aqueous layer was separated and made basic with 700 ml. of 10 N sodium hydroxide with cooling.

The oil was taken up in ether, the ether was dried over potassium carbonate and the solution was concentrated on the steam bath to give 926 g. of crude "alkylate." The crude product was distilled at 110–117°/0.8–1 mm. to afford 727 g. of colorless liquid which assayed 83% 3-methyl isomer and 17% 2-methyl isomer. *Similar runs have given 90–10 ratios,* of the 3-methyl and 2-methyl isomers respectively.

B. The alkylate (328 g.) was dissolved in 2.4 l. of toluene and 72 g. of sodamide was added in portions. The solution was heated at 50° for 2 hours with stirring and a nitrogen flow. The sodium salt of the nitrile precipitated. The mixture was cooled and 304 g. of trimethylene chlorobromide in 300 ml. of toluene was added slowly keeping the temperature below 10°. Stirring was continued for 1 hour at 10° and the temperature was allowed to rise to room temperature overnight with continued agitation.

Water (1 l.) was added. The aqueous layer was discarded and the toluene layer was washed with 1 liter of water. The organic portion was dried over sodium sulfate, filtered and during 3 hours was dropped into 3.2 l. of refluxing n-decanol allowing the toluene to boil out of the reaction mixture. Reflux was continued for 1½ hours. The mixture was cooled, washed with 1.5 l. of water and extracted with 350 ml. of 6 N HCl. The acid layer was separated, washed with 2× 50 ml. of ether and made basic with 600 ml. of 4 N sodium hydroxide. The oil was taken up in 1 l. of ether which was thereupon dried with sodium sulfate and evaporated. There remained 346 g. of crude "cyano base."

The crude cyano base was dissolved in 1 l. of acetone and 1 l. of methylethyl ketone. With cooling, dry hydrogen chloride was passed in until an acid reaction was obtained in the supernatant solution. The precipitate was collected and washed with 1 l. of acetone: MEK (1:1) followed by 0.5 l. of ether. After drying overnight in the steam oven there was obtained 163 g. of "cyano base.HCl," M.P. 250–252°. Recrystallization from 2 ml. of absolute ethanol gave 118 g. of "3-methyl cyano base." HCl, M.P. 263–265°, pure as shown by gas chromatography of the base.

C. 3-methylcyano base.HCl (220 g.) in 138 g. of water and 564 g. of sulfuric acid was heated at 125° for 3 hours. The mixture was cooled and 2.5 l. of absolute ethanol was added. The solution was heated under reflux for 24 hours and the alcohol was distilled out. Additional ethanol (1.2 l.) was added and also distilled out. The solution was cooled and a solution 800 g. of sodium carbonate in 2.5 l. of water was added cautiously. The product was extracted with 1.5 l. of ether and the ether was dried over potassium carbonate. The ether was removed and the residue was taken up in 1.5 l. of methylethyl ketone. Anhydrous HCl was passed in until the solution was acid. The product was filtered off and washed with cold MEK (ca. 500 ml.). The yield was 177 g. of (71%), M.P. 198–200°. Gas chromatography of the base isolated from this material showed a single peak. A small amount of additional product can be obtained by concentrating the mother liquors.

We claim:
1. In a process for preparing a compound of the formula:

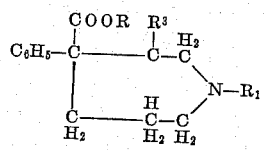

wherein R, $R^1$ and $R^3$ each represent a lower alkyl group which comprises
   (1) initially alkylating a solution of phenylacetonitrile to form a 2-aryl-4-dialkylamino butyronitrile
   (2) alkylating the 2-aryl-4-dialkylamino butyronitrile with a reactant selected from the group consisting of a polymethylene sulfonic acid ester and a polymethylene dihalide each having 3 methylene groups;
   (3) cyclizing the product obtained to form a cyclic quaternary ammonium compound
   (4) heating the quaternary salt to remove alkyl halide
   (5) hydrolyzing the resulting tertiary amino nitrile in the presence of alcohol to form the carboxylic acid ester the improvement which comprises employing in the initial alkylation step as a reaction solvent the liquid dimethyl formamide so as to alter the course of the reaction in favor of the ultimate production of the 1,3 dialkyl azacycloheptane over its 1,2 isomer.

2. A method for the preparation of a compound having the formula:

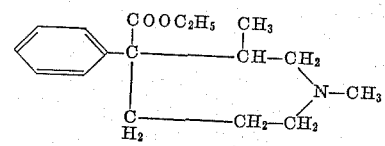

which comprises
   (1) alkylating a phenylacetonitrile with a reagent such as 1-dimethylamino 2-chloropropane to obtain the product:

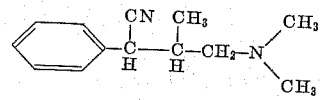

said alkylation taking place in the presence of the selective reaction solvent dimethyl formamide;
   (2) reacting the aforesaid intermediate as its alkali metal salt with a solution of trimethylene chlorobromide at a temperature of 10° for 1 hour with reaction then continued for 12 hours at room temperature to obtain the product:

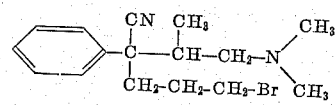

(3) cyclizing the aforesaid intermediate with a solution of decanol to obtain the product:

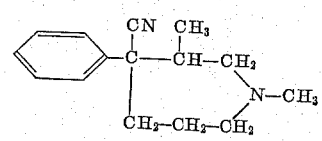

(4) hydrolyzing the aforesaid intermediate by treatment with strong acid and esterifying to obtain the final product.

No references cited.

ALEX MAZEL, *Primary Examiner.*
ALTON D. ROLLINS, *Assistant Examiner.*